United States Patent Office 3,654,279
Patented Apr. 4, 1972

3,654,279
COMPLEX OF THE FORMULA PdL(CO)X₂ WHERE L IS HETEROAROMATIC NITROGEN COMPOUND AND X IS A HALIDE
Thomas J. Hurley, Jr., Madison, and Martin A. Robinson, Orange, Conn., assignors to Olin Mathieson Chemical Corporation
No Drawing. Filed June 21, 1968, Ser. No. 738,829
Int. Cl. C07d *35/18*
U.S. Cl. 260—270                                      6 Claims

ABSTRACT OF THE DISCLOSURE

A new composition of matter having the formula $$PdL(CO)X_2$$

where L is a Lewis base and where X is a halogen. This composition is prepared by reacting carbon monoxide with a Lewis base and a palladium-containing material selected from the group consisting of (a) palladium dihalide
(b) a mixture of elemental palladium with an acid halide, and
(c) mixtures thereof, in the presence of a liquid reaction medium. The resulting complex is useful as a catalyst in the preparation of organic isocyanates by reacting carbon monoxide with an organic nitro compound.

The Lewis base is a heteroaromatic nitrogen compound having a heteroaromatic ring which contains (a) 5 or 6 members in the ring,
(b) only nitrogen and carbon in the ring,
(c) no more than 2 nitrogens in the ring, and
(d) at least 2 double bonds in the ring.

Typical heteroaromatic nitrogen compounds include pyridine and isoquinoline.

---

This invention relates to novel palladium-containing carbonyl complexes and to processes for preparing them. It also relates to the use of these complexes as catalysts in an improved process for preparing organic isocyanates directly from the corresponding organic nitro compound.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Patent No. 1,025,436 discloses a process for preparing isocyanates from the corresponding nitro compounds by reacting an organic nitro compound with carbon monoxide in the presence of a noble metal-based catalyst. This process is not used commercially because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgium Pat. No. 672,405, entitled "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is an object of this invention to provide a novel palladium carbonyl complex with a Lewis base and a halide.

Another object of this invention is to provide processes for preparing a palladium carbonyl complex with a halide and a Lewis base.

Still another object of the invention is to provide an improved process for preparing organic isocyanates from organic nitro compounds.

These and other objects of the invention will be apparent from the following detailed description.

It has now been discovered that the foregoing objects are accomplished when carbon monoxide is reacted with a Lewis base and a palladium-containing material selected from the group consisting of (a) palladium dihalide, (b) a mixture of elemental palladium with an acid halide, and (c) mixtures thereof, in the presence of a liquid reaction medium, thereby producing a palladium carbonyl complex with a Lewis base and a halide. The complex has a structural formula: $PdL(CO)X_2$, where L is a Lewis base and where X is a halogen. This complex is useful as a catalyst in the preparation of organic isocyanates by reacting carbon monoxide with an organic nitro compound.

More in detail, the palladium-containing substance is selected from a group consisting of (a) palladium dihalide, (b) a mixture of elemental palladium with an acid halide, and (c) mixtures thereof. The palladium dihalide is selected from the group consisting of palladium dichloride, palladium dibromide, palladium diiodide, and palladium difluoride. The palladium dihalide or elemental palladium are used preferably in powdered form, in order that the maximum surface area is available for reaction. However, when a rapid reaction rate is not necessary, granulated or pelleted forms may be employed.

The Lewis base used to prepare the novel complex of this invention is any Lewis base capable of forming a complex with palladium, carbonyl and halide. It is preferred to employ a heteroaromatic nitrogen compound containing between five and six members in the ring, containing only nitrogen and carbon in the ring, containing no more than two nitrogen atoms in the ring, and containing at least two double bonds in the ring. Suitable compounds of this type are disclosed in The Ring Index by Patterson and Capell, second edition, American Chemical Society, 1960, and Supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic ring of the following type:

(I) Substituents on the ring
  (a) halides such as chlorine, bromine, iodine and fluorine
  (b) alkyl containing between 1 and 40 carbon atoms
  (c) aryl such as phenyl, cresyl and xylyl
  (d) olefinic such as allyl, vinyl
  (e) hydroxy
  (f) mercapto
  (g) amino
  (h) alkylamino
  (i) cyano
  (j) oximino
  (k) aldehyde
  (l) ethers such as aryl, alkyl, and alkenyl ethers
  (m) thioethers such as aryl, alkyl, and alkenyl ethers
  (n) carboxy
  (o) carbalkoxy
  (p) carbamyl
  (q) carboaryloxy
  (r) thiocarbamyl
(II) Polcyclic analogues
  (a) fused benzene
  (b) fused cycloaliphatic
  (c) fused nitrogen-containing heteroaromatic
(III) Simple salts
(IV) Quaternary salts
(V) Oxides
(VI) Complexes with inorganic substances other than noble metal halides
(VII) Mixtures of two or more additions of types I–VI Listed below are typical heteroaromatic nitrogen compounds and derivatives thereof which are suitable for use as components of the novel complex of this invention.

(1) Five membered ring containing one nitrogen
  (a) 1-methyl pyrrole
  (b) 1-phenyl pyrrole
(2) Five membered ring containing two nitrogens
  (a) imidazole
  (b) 1-methyl imidazole
  (c) pyrazole
(3) Fused benzene and fused nitrogen-containing heteroaromatic derivatives of five membered rings containing one nitrogen
  (a) indole
  (b) indolenine (3-pseudoindole)
  (c) 2-isobenzazole
  (d) indolizine
  (e) 4aH-carbazole
  (f) carbazole
(4) Six membered ring containing one nitrogen and derivatives thereof
  (a) pyridine
  (b) 2,6-dimethylpyridine
  (c) 2,4,6-trimethylpyridine
  (d) 4-phenylpyridine
  (e) 2-vinylpyridine
  (f) 2-styrylpyridine
  (g) 2-bromopyridine
  (h) 2-chloropyridine
  (i) 3-chloropyridine
  (j) 2,6-dichloropyridine
  (k) 2-bromo-4-methylpyridine
  (l) 2-fluoropyridine
  (m) 2-allyloxypyridine
  (n) 4-phenylthiopyridine
  (o) 2-methoxypyridine
  (p) picolinic acid
  (q) nicotinic acid
  (r) 2,6-dicyanopyridine
  (s) pyridine-2-aldehyde (picolinaldehyde)
  (t) 2-aminopyridine
  (u) 4-dimethylaminopyridine
  (v) diphenyl-4-pyridylmethane
  (w) 4-hydroxypyridine
  (x) 2-mercaptopyridine
  (y) 2-oximinopyridine (picolinaldoxime)
  (z) 4-tertiarybutylpyridine
(5) Fused benzene and fused nitrogen-containing heteroaromatic derivatives of six membered ring containing one nitrogen
  (a) quinoline
  (b) 2-chloroquinoline
  (c) 8-hydroxyquinoline
  (d) isoquinoline
  (e) acridine
  (f) phenanthridine
  (g) 7,8-benzoquinoline
  (h) 4H-quinolizine
  (i) naphthyridine
  (j) carboline
  (k) phenanthroline
  (l) Benzo [h] isoquinoline
  (m) Benzo [g] quinoline
  (n) Benzo [g] isoquinoline
  (o) Benzo [h] quinoline
  (p) Benzo [f] quinoline
  (q) Benzo [f] isoquinoline
  (r) 1H-Benzo [de] quinoline
  (s) 4H-Benzo [de] quinoline
  (t) 4H-Benzo [de] isoquinoline
  (u) 1H-Benzo [de] isoquinoline
  (v) purine
  (w) adenine
  (x) pteridine
  (y) 7H-Pyrazino [2,3-c] carbazole
  (z) Pyrazino [2,3-d] pyridazine
  (aa) 4H-Pyrido [2,3-c] carbazole
  (bb) Pyrido [1',2':1,2] imidazo [4,5-b] quinoxaline
  (cc) 6H-perimidine
  (dd) perimidine
(6) Six membered ring containing two nitrogens and derivatives thereof
  (a) pyrazine
  (b) 4,6-dimethylpyrimidine
  (c) 2,6-dimethylpyrazine
  (d) pyridazine
(7) Fused benzene and fused nitrogen-containing heteroaromatic derivatives of six membered rings containing two nitrogens
  (a) quinoxaline
  (b) 2,3-dimethylquinoxaline
  (c) phthalazine
  (d) quinazoline
  (e) phenazine
  (f) cinnoline
(8) Simple salts of heteroaromatic nitrogen compounds or derivatives thereof in sections 1–7 above.
  (a) Simple salts include nitrates, hydrohalides, sulfates and acetates of these compounds such as the following:
    (1) pyridine hydrochloride
    (2) 2-chloropyridine-1-oxide hydrochloride
    (3) 4-chloropyridine hydrochloride
    (4) 4,4'-bipyridyl dihydrochloride
(9) Quaternary salts of heteroaromatic nitrogen compounds or derivatives thereof of sections 2 and 4–7 above.
  (a) Alkyl halides, where alkyl contains 1–40 carbon atoms, acyl halides, and nitroaryl halides, such as:
    (1) 1-methylquinolinium chloride
    (2) laurylpyridinium chloride
    (3) 1-(4-pyridyl) pyridinium chloride hydrochloride
(10) Oxides of heteroaromatic bases and derivatives thereof of sections 2 and 4–7 above.

(a) Oxides includes oxides of quinoline, pyridine, isoquinoline and imidazole, and are illustrated by the following oxides:
   (1) pyridine-1-oxide
   (2) 4-bromopyridine-1-oxide
   (3) 2-hydroxypyridine-1-oxide
   (4) picolinic acid-1-oxide
   (5) 4-methoxy pyridine-1-oxide
   (6) 2-bromo-6-methylpyridine-1-oxide
   (7) 2-picoline-1-oxide
   (8) 4-picoline-1-oxide
(11) Complexes of heteroaromatic nitrogen compound with inorganic substances (other than noble metal halides) of sections 2 and 4–7 above.
   (a) Complexes include pyridine, quinoline and isoquinoline complexes illustrated by the following pyridine complexes:
      (1) (pyridine)$_3 \cdot$FeCl$_3$
      (2) pyridine$\cdot$SO$_3$
      (3) pyridine$\cdot$CrO$_3$
      (4) pyridine$\cdot$VCl$_3$
      (5) pyridine$\cdot$V$_2$O$_5$
      (6) pyridine$\cdot$MoO$_3$ As indicated above, heteroaromatic compounds containing only nitrogen and carbon in the ring are preferably used as the Lewis base, but a heteroaromatic compound which contains only carbon and sulfur or only carbon and oxygen, or carbon and two or more elements selected from the group consisting of nitrogen, sulfur, and oxygen may also be employed as the Lewis base. Typical heteroaromatic compounds, in addition to those mentioned above, include thiophene, dibenzofuran, 2,5-diphenyloxazole, 2-mercaptobenzothiazole, thionaphthene, and the like, may also be used as the Lewis base.

The reaction between the palladium-containing material, Lewis base and carbon monoxide is effected in the presence of a liquid reaction medium. It is preferred to employ halogenated aromatic hydrocarbons such as monochlorobenzene, dichlorobenzene, trichlorobenzene, monochloronaphthalene, chlornated biphenyl, dichlorotoluene, dichloroxylene, mixtures thereof, and the like. Suitable halogenated aliphatic hydrocarbons include dichloromethane, tetrachloroethane, trichloroethylene, perchloroethylene, chloroform, carbon tetrachloride, trichloropropane, fluorinated hydrocarbons such as trichlorofluoromethane, trichlorotrifluoroethane, tetrachlorodifluoroethane, mixtures thereof, and the like.

Other suitable liquid reaction mediums include aromatic hydrocarbons and alkyl-substituted aromatic hydrocarbons, which are all herein referred to as "aromatic hydrocarbons." Typical aromatic hydrocarbons include benzene, toluene, xylene, methyl naphthalene, mixtures thereof, and the like.

When a mixture of elemental palladium and acid halide is the palladium-containing material, the liquid reaction medium contains between about 2 and about 50 percent by weight of an acid halide. Suitable acid halides include phosgene, thionyl chloride, sulfuryl chloride, oxalylchloride, benzenesulfonylchloride, benzoylchloride, thionyl bromide, thionyl fluoride, phosphorus oxychloride, phosphorus oxyfluoride, phosphorus oxybromide, vanadyl monobromide (VOBr), vanadyl dibromide (VOBr$_2$), vanadyl tribromide (VOBr$_3$), vanadyl chloride (VO)$_2$Cl, vanadyl dichloride (VOCl$_2$), vanadyl trichloride (VOCl$_3$), mixtures thereof, and the like. Other suitable acid halides are disclosed in Canadian Patent No. 692,093, issued Aug. 4, 1964, to Ehrenfried H. Kober et al. If desired, an acid halide may also be employed in the same proportions when the palladium-containing material is palladium dihalide, but it is not essential in the latter case.

The proportion of liquid reaction medium is not critical, and any proportion may be employed which will not require excessively large equipment to contain. Generally, the weight percent of palladium-containing material in the liquid reaction medium is in the range between about 0.1 and about 75.0 percent, but greater or lesser proportions may be employed if desired.

In one embodiment of the invention for preparing the complex, carbon monoxide if fed to a suspension of the palladium-containing substance and Lewis base in the liquid reaction medium by any suitable technique. In one embodiment, the palladium-containing material, Lewis base and liquid reaction medium are charged to a suitable pressure vessel such as an autoclave which was previously purged with nitrogen, and which is preferably provided with agitation means such as a stirrer or an external rocking mechanism. Carbon monoxide is then fed into the autoclave until the desired pressure is attained.

The molar ratio of the Lewis base to palladium halide equivalent is generally between about 0.1:1 and about 10:1, and preferably between about 0.5:1 and about 1.5:1, but greater or lesser ratios may be employed if desired.

Generally, the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The total amount of carbon monoxide charged during the reaction is generally between about 2 and about 500, and preferably between about 100 and about 250 moles of carbon monoxide per gram-atomic weight of palladium in the palladium-containing material. Greater or lesser amounts may be employed if desired. The highest carbon monoxide requirements are generally utilized in a process in which the carbon monoxide is added continuously, but suitable recycle of the carbon monoxide containing gas streams greatly reduces the over-all consumption of carbon monoxide.

The reaction pressure may be sub-atmospheric, atmospheric or superatmospheric. Generally the reaction pressure is in the range between about 14 and about 8000 p.s.i.a., and preferably between about 14.7 and about 4000 p.s.i.a., but greater or lesser pressures may be employed, if desired.

The reaction temperature is maintained above about 20° C. and preferably between about 100 and about 250° C. Interior and/or exterior heating and cooling means may be employed to maintain the temperature within the reactor within the desired range.

The reaction time is dependent upon the palladium-containing material being reacted, as well as the type of equipment being employed. Usually between about 0.5 hour and about 3.0 hours are required to obtain the desired degree of reaction, but shorter or longer reaction times may be employed.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the novel solid palladium carbonyl halide complex from the liquid reaction medium. The novel compound of this invention has the structural formula $$[PdL(CO)X_2]$$

where L is a Lewis base of the type described above, and where X is selected from the group consisting of chlorine, bromine, fluorine, and iodine. The novel palladium carbonyl halide complex of this invention, because of its exceptional stability, is useful as a carbonylation agent in a wide variety of commercial processes.

In another embodiment of the invention for preparing the novel complex, a palladium halide is reacted with benzonitrile and the resulting reaction product is reacted with ethylene to form 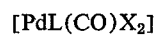. This ethylene adduct is reacted with pyridine or other Lewis base to form the complex Pd(C₅H₅N)(C₂H₄)Cl₂. A reaction of this complex with carbon monoxide forms the novel complex of this invention having the empirical formula $$Pd(C_5H_5N)(CO)Cl_2$$

In another embodiment of this invention, a complex of the empirical formula [PdLCl₂]₂ is formed by reacting PdCl₂ with a Lewis base in a molar ratio of about 1:1 in a chloroform-methanol solvent, and then reacting carbon monoxide with the resulting complex at a pressure at about 2500 p.s.i. for a period of about 90 minutes. After the reaction is completed, the reaction vessel is vented and the novel complex, having the formula, PdL(CO)Cl₂ is recovered from the reaction medium.

The novel palladium complex of this invention is particularly effective as a catalyst in the conversion of aromatic nitro compounds to organic isocyanates. As used herein, the term "aromatic nitro compound" represents those aromatic nitro compounds having at least one nitro group attached directly to an aromatic hydrocarbon nucleus, such as benzene, naphthalene, and the like, wherein the aromatic hydrocarbon nucleus may be substituted as illustrated below. Among the preferred organic nitro compounds which may be used in the practice of this invention are the nitrobenzenes, both mono- and polynitro, including isomeric mixtures thereof; the nitroalkylbenzenes, including the various biphenyl and nitrated diphenylmethylene. Other preferred reactants include bis(nitrophenoxy) alkylene and bis(nitrophenoxy)alkyl ethers. Generally, the organic nitro compounds and substituted organic nitro compounds contain between 1 and about 20 carbon atoms, and preferably between about 6 and about 14 carbon atoms.

The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds:
  (a) Nitrobenzene
  (b) Nitronaphthalenes
  (c) Nitroanthracenes
  (d) Nitrobiphenyls
  (e) Bis(nitrophenyl)methanes
  (f) Bis(nitrophenyl)ethers
  (g) Bis(nitrophenyl)thioether
  (h) Bis(nitrophenyl)sulfones
  (i) Nitrodiphenoxy alkanes
  (j) Nitrophenothiazines
(II) Nitrocycloalkanes
  (a) Nitrocyclobutane
  (b) Nitrocyclopentane
  (c) Nitrocyclohexane
  (d) Dinitrocyclohexanes
  (e) Bis(nitrocyclohexyl)methanes
(III) Nitroalkanes
  (a) Nitromethane
  (b) Nitroethane
  (c) Nitropropane
  (d) Nitrobutanes
  (e) Nitrohexanes
  (f) Nitrooctanes
  (g) Nitrooctadecanes
  (h) Dinitroethane
  (i) Dinitropropanes
  (j) Dinitrobutanes
  (k) Dinitrohexanes
  (l) Dinitrodecanes
  (m) Phenyl nitromethane
  (n) Bromophenyl nitromethanes
  (o) Nitrophenyl nitromethanes
  (p) Methoxy phenyl nitromethanes
  (q) Bis-(nitromethyl)cyclohexanes
  (r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-Chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-Chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride

(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant. Aromatic nitro compounds are preferably employed as a reactant.

Although all of the aforesaid novel complexes have some effect on improving the yield of isocyanate, certain complexes are significantly more effective than others. Included in these more effective complexes are those formed with the Lewis base component of the complex being one of the following heteroaromatic compounds:

(1) 7,8-benzoquinoline
(2) 4-phenylpyridine
(3) 4-picoline-1-oxide
(4) 3-picoline-1-oxide
(5) 8-hydroxyquinoline
(6) Pyridine
(7) Quinoline
(8) Isoquinoline
(9) 3-chloropyridine
(10) Picolinic acid
(11) Imidazole
(12) Lauryl pyridinium chloride Preferred heteroaromatic nitrogen compounds include pyridine, isoquinoline, quinoline pyridine-N-oxide, 2,6 lutidine and mixtures thereof.

The catalyst can be self-supported or deposited on a support or carrier for dispesing the catalyst to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the novel complex of this invention as catalyst. The proportion of catalyst is generally equivalent to between about 0.001 and about 500 percent, and preferably between about 1 and about 100 percent by weight of the aromatic nitro compound. However, greater or lesser proportions may be employed if desired.

The reaction between carbon monoxide and organic nitro-compound can be effected in the absence of a solvent, but improved overall yields of the organic isocyanates can be obtained when a solvent which is chemically inert to the components of the reaction system is employed. Suitable solvents include aliphatic cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 2.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I) 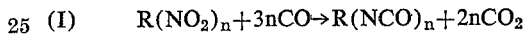

$$R(NO_2)_n + 3nCO \rightarrow R(NCO)_n + 2nCO_2$$

where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. Usually between one-half hour and 20 hours are required to obtain the desired degree of reaction in a batch technique, but shorter or longer reaction times may be employed. In a continuous process, the reaction may be much lower, i.e., substantially instantaneous, and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains the novel complex of this invention, but also contains a second component comprised of certain metal oxides. Oxides suitable as a third component of the catalyst system include at least one oxide of an element selected from the group consisting of vanadium, molybdenum, tungsten, niobium, chromium and tantalum, as described in co-pending Application Ser. No. 619,159, filed Feb. 28, 1967 for Process, by Wilhelm J. Schnabel, Ehrenfried H. Kober and Theodore C. Kraus. These elements are found in Groups V-B and VI-B of the Periodic Table. Suitable oxides of this type include chromic oxide ($Cr_2O_3$), chromium dioxide ($CrO_2$), and chromous oxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadiumdioxide ($V_2O_2$), vanadium trioxide ($V_2O_3$), vanadium tetraoxide ($V_2O_4$) and vanadium pentoxide ($V_2O_5$). Mixtures of two or more of these oxides may be employed as one component of the catalyst mixture. The proportion of the second component of the catalyst system, when one is employed, is generally equivalent to a weight ratio of the novel complex to the metal oxide in the catalyst system generally in the range between about 0.0001:1 and about 25:1, and preferably in the range between about 0.005:1 and about 5:1.

The following examples are presented to describe the invention more fully without any intention of being limited thereby. All parts and percentages are by weight unless otherwise specified.

EXAMPLE 1

In preparing the novel complexes of this invention in these examples, an apparatus of the type described below was employed. The reactor was a 100 ml. stainless-steel autoclave (316 grade) adapted to be rocked in a rocker at a rate of about 36 cycles per minute. The reactor was provided with a glass liner, heating coils and means for feeding gas into the gas space to obtain the desired pressure.

Palladium dichloride (1.8 grams, 0.01 mole), pyridine (0.8 grams, 0.01 mole), and 5 ml. of ortho dichlorobenzene were placed in the reactor and the reactor was sealed. Carbon monoxide was fed to the reactor until a pressure of 2500 p.s.i.g. was obtained. The reactor was heated to a temperature of 190° C. for a period of 1.5 hours, with constant rocking during the reaction. At the end of this period, carbon monoxide was released from the autoclave, the temperature was allowed to drop to ambient temperature, the reaction was removed from the autoclave and filtered. The resulting solid product was washed with dry dichloromethane, and then subjected to infrared analysis. Analysis of the product showed that it had a composition $Pd(Py)(CO)Cl_2$ and the infrared spectrum showed the main C=O band at 1925 cm.$^{-1}$.

EXAMPLE 2

The composition of Example 1 (0.6 gram) was placed in a clean autoclave of the type described in Example 1 along with 0.01 gram of molybdenum trioxide, 3 g. of dinitrotoluene and 5 ml. of orthodichlorobenzene. The autoclave was sealed and the pressure was increased to 2500 p.s.i.g. with carbon monoxide. The reactor was heated to a temperature of 190° C, for 90 minutes while rocking the autoclave over this period.

Analysis of the reaction product showed a 75 percent conversion of the dinitrotoluene, a corrected yield of dinitrotoluene of 5 percent and a total corrected yield of isocyanates of 35 percent.

EXAMPLE 3

Palladium dichloride (1.8 grams, 1.01 mole) was placed in the reactor of Example 1 in the presence of 100 ml. of benzonitrile and heated to reflux for about 15 minutes. The reaction mass was cooled and filtered to recover the solid product $Pd(C_6H_5CN)_2Cl_2$. Two grams of this product were dissolved in 40 ml. of benzene, filtered to remove impurities and the resulting solution was placed in the reactor. Ethylene was then bubbled through the solution for about ½ hour, during which time a solution precipitated having the composition, $[Pd(C_2H_4)Cl_2]_2$. This slurry was filtered under ethylene and the resulting solid was collected and weighed (1.35 grams). This solid was dissolved in 25 ml. of dry chloroform, stirred under ethylene, and cooled in an ice-water bath to 5° C. After cooling, pyridine-N-oxide (0.42 grams) dissolved in chloroform was added dropwise. After addition of the pyridine-N-oxide, the solution became clear and stirring was continued for approximately 5 minutes. Carbon monoxide was then bubbled through the solution for about 40 minutes, during which time a small amount of precipitate was formed which was filtered off in a dry box. Heptane was added to the filtrate until the cloud point was reached, and the resulting mixture was allowed to stand overnight in the dry box, which resulted in the formation of crystals. These crystals were filtered off, washed with heptane and dried under nitrogen. The crystals weighed 0.73 gram, which represented a yield of about 50 percent of the complex, $Pd(CO)(PyN \rightarrow O)Cl_2$.

EXAMPLE 4

The procedure of Example 2 was repeated with the exception that the complex was a pyridine-N-oxide complex of Example 3 (0.2 gram). Analysis of the reaction product showed that there was 11 percent conversion of the dinitrotoluene, and the corrected yield of isocyanates was 14 percent.

EXAMPLES 5-6

The procedure of Example 3 was repeated with the exception that the pyridine-N-oxide was replaced with 2,6-lutidine and isoquinoline in Examples 5 and 6, respectively. The complexes produced were identified as:

| Example: | Complex |
|---|---|
| 5 | $Pd(CO)(2,6\text{-lutidine})Cl_2$ |
| 6 | $Pd(CO)(\text{isoquinoline})Cl_2$ |

EXAMPLES 7-8

The procedure of Example 2 was repeated with the exception that 0.5 grams of the complexes formed in Examples 5 and 6 were each used as the catalyst. In addition, the reaction temperature was 200° C. instead of 190° C. Analysis of the reaction products were as follows:

| Example | Percent conversion | Percent yield of isocyanates |
|---|---|---|
| 7 | 25 | 11 |
| 8 | 16 | 7 |

Various modifications of the invention, some of which have been referred to above, may be employed without departing from the spirit of the invention.

What is desired to be secured by Letters Patent is:

1. The composition having the formula $PdL(CO)X_2$ where L is selected from the group consisting of pyridine, isoquinoline, quinoline, pyridine-N-oxide, 2,6-lutidine, and mixtures thereof, and X is halogen.

2. The composition of claim 1 where X is chlorine.

3. The composition of claim 2 wherein L is pyridine.

4. The composition of claim 2 wherein L is isoquinoline.

5. The composition of claim 2 wherein L is pyridine-N-oxide.

6. The composition of claim 2 wherein L is 2,6-lutidine.

References Cited

UNITED STATES PATENTS

| | | | |
|---|---|---|---|
| 3,182,051 | 5/1965 | Marullo | 260—270 X |
| 3,318,891 | 5/1967 | Hausman | 260—270 |
| 3,424,739 | 1/1969 | Cope | 252—431 |
| 3,450,730 | 6/1969 | Scheben et al. | 252—431 X |
| 3,475,471 | 10/1969 | Maxfield | 260—270 X |
| 3,480,632 | 11/1969 | Scheben et al. | 260—270 X |

OTHER REFERENCES

Clement; Jour. Organo. Metal. Chem., vol. 10, pp. 19–20 (1967).

DONALD G. DAUS, Primary Examiner

U.S. Cl. X.R.

252—438; 260—240.9, 242, 243 A, 299, 313.1, 315, 319.1, 326 N, 329 ME, 346.1 M, 453 AR, 465 R, 609 R, 611 A, 644, 645, 646